Patented Jan. 27, 1925.

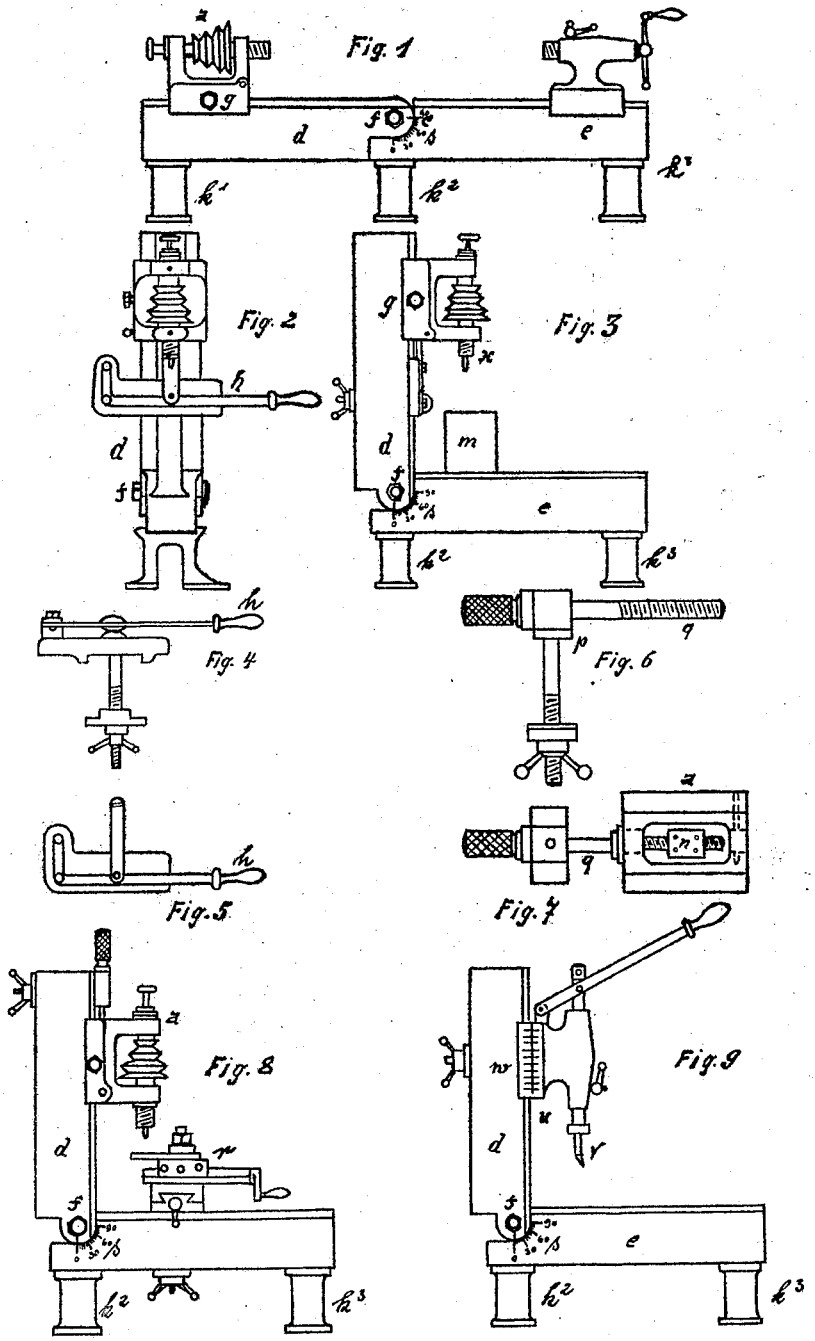

1,524,224

UNITED STATES PATENT OFFICE.

GEORG WERNER, OF FRANKFORT-ON-THE-MAIN, GERMANY.

LATHE.

Application filed January 5, 1923. Serial No. 610,856.

*To all whom it may concern:*

Be it known that I, GEORG WERNER, engineer, a citizen of the German Empire, and residing at Frankfort-on-the-Main, Germany, have invented certain new and useful Improvements in Lathes, of which the following is a specification.

My invention relates to lathes and has for its object to render such apparatus suitable for still other work.

To this end the lathe-bed is articulated in such a manner that one portion of the lathe which normally forms a straight line may be tilted up and fixed in any desired position of angle and the axis of the working spindle may be brought into any desired position with relation to the axis of the sliding-puppet and to the direction of motion of the slide.

In the accompanying drawings, Fig. 1 is a front elevation of the lathe according to my invention. Fig. 2 is a side view of the same with one portion of the bed tilted up, while Fig. 3 is a front view of Fig. 2. Figs. 4 to 7 illustrate some special details of feeding devices to be used in connection with my invention. Figs. 8 and 9 represent two modifications of the lathe according to my invention proving the adaptability of the same to different working purposes.

It may be mentioned beforehand that in connection with drilling machines it is already known to subdivide the standard by means of a joint into two portions movable with relation to one another.

My invention, however, relates to a lathe which, by means of a simple contrivance, may be rendered serviceable as a drilling machine, a cutting machine or a shaping machine according to the requirement.

Referring more particularly to the drawings, Fig. 1 illustrates my invention in connection with a lathe of the ordinary type. $a$ is the head-stock carried by and clamped by means of the screw $g$ to the bed $d$, $e$. The lathe is supported by feet or standards $k_1$, $k_2$, $k_3$. If desired two feet may be provided at $c$ thus permitting either portion of the lathe-bed to be tilted up. According to the invention a joint with limbus is provided in the bed at $c$, whereby the same is divided into two portions $d$, $e$. When loosening the fixing-screw $f$ in the joint $c$ and turning upwardly the portion $d$ about an angle of 90° the working spindle stands vertically with relation to the portion $e$ of the bed. After insertion of a draw-lever $h$ the lathe may be used as a drilling-machine, as it is shown in Figs. 2 and 3. The drilling-machine thus obtained offers the advantage of a great series of drilling work to be effected with any desired and constant position of angle without necessitating any gauge or the like.

The means for clamping the drills or other tools are the same as commonly used in connection with lathes.

When the draw-lever $h$ shown in Figs. 4 and 5 is replaced by the threaded feeder of Figs. 6 and 7, connected to head-stock $a$ on the bed $d$, the lathe according to my invention will be adapted for effecting such accurate work as cutting key-grooves, edges or the like since this feeder will allow of an adjustment to the thickness of a bore-chip as it is required with such work. To this end a nut $n$ is provided in the bottom of the head-stock $a$ engaging the threaded spindle $q$ (Figs. 6 and 7) and connecting the feeding device $p$ to the head-stock $a$. When grooves are to be cut into pivots or shafts the lever provided with a chuck serves as work-piece holder while for working hollow spaces of stamping-dies the support $r$ is a very convenient work-piece holder (Fig. 8).

Fig. 9 shows another modification of my invention wherein the head-stock is replaced by the boring-lever $u$ which, in the known manner, is provided with a chuck serving to clamp the chisel or plane-iron $v$. The sliding puppet is provided with a turning-plate $w$ thus rendering the machine suitable for planing grooves into any work-pieces clamped to the portion $e$ of the lathe-bed or even to replane the flanks of the teeth of repaired conical wheels.

Now, what I claim, is:—

1. In a machine of the character described, a sectional bed having a three point support, the sections being pivoted above the center support to form relatively fixed and movable sections, the movable section being adapted to be swung into a vertical plane, and a work engaging device mounted on said movable section.

2. In a machine of the character described, a sectional bed having a three point support, the sections being pivoted above the center support to form relatively fixed and movable sections, the movable section being adapted to be swung into a vertical plane, a vertically disposed work-engaging tool mounted on said movable section for vertical movements, and means for moving said tool vertically.

3. In a machine of the character described, a sectional bed having a three point support, the sections being pivoted above the center support for form relatively fixed and movable sections, the movable section being adapted to be swung into a vertical plane, a drill mounted on said movable section for vertical movements, a clamp secured to said movable member, and means for moving said drill vertically comprising a hand lever fulcrumed on said clamp, and a link connecting said drill and said lever.

In testimony whereof I have affixed my signature in presence of two witnesses.

GEORG WERNER.

Witnesses:
 FRITZ BIEDENKEGGS,
 HERMANN DIEHL.